(12) United States Patent
Gates et al.

(10) Patent No.: US 8,451,457 B2
(45) Date of Patent: May 28, 2013

(54) CHROMATIC CONFOCAL SENSOR

(75) Inventors: Brian J. Gates, Osceola, WI (US);
Craig R. Sykora, New Richmond, WI (US); Dean Faklis, Wayland, NY (US);
Andrew J. Murnan, Saratoga Springs, NY (US); Nestor O. Farmiga, Rochester, NY (US)

(73) Assignee: 3m Innovative Properties Company, Saint Paul, MN (US)

( * ) Notice: Subject to any disclaimer, the term of this patent is extended or adjusted under 35 U.S.C. 154(b) by 107 days.

(21) Appl. No.: 12/681,926

(22) PCT Filed: Oct. 3, 2008

(86) PCT No.: PCT/US2008/078724
§ 371 (c)(1),
(2), (4) Date: Jul. 26, 2010

(87) PCT Pub. No.: WO2009/048808
PCT Pub. Date: Apr. 16, 2009

(65) Prior Publication Data
US 2010/0296106 A1    Nov. 25, 2010

Related U.S. Application Data

(60) Provisional application No. 60/979,240, filed on Oct. 11, 2007.

(51) Int. Cl.
*G01B 11/14* (2006.01)
*H01L 21/027* (2006.01)

(52) U.S. Cl.
USPC ............... 356/614; 250/492.1; 250/492.2; 250/216; 356/445

(58) Field of Classification Search
USPC .............. 356/614, 445; 250/492.1, 492.2, 250/492.22; 430/270.1, 321; 359/619, 621, 359/622, 626, 628
See application file for complete search history.

(56) References Cited

U.S. PATENT DOCUMENTS

| 3,018,262 A | 1/1962 | Schroeder |
| 3,729,313 A | 4/1973 | Smith |

(Continued)

FOREIGN PATENT DOCUMENTS

| CN | 1932555 | 3/2007 |
| EP | 841140 | 5/1998 |

(Continued)

OTHER PUBLICATIONS

"Microlenslet Array Based Magnifying System," Shaoulov, Breault Research Organization, Inc., Tucson, AZ, USA, [on line], [retrieved from the internet on Feb. 7, 2011], URL <www.breault.com/resources/kbasePDF/wp_spie_026_microlenslet_array.pdf>, 8 pages. (date unknown but believed to be prior to the date of filing of the priority application).

(Continued)

*Primary Examiner* — Sang Nguyen
(74) *Attorney, Agent, or Firm* — Kristopher L. Storvick

(57) ABSTRACT

A system comprising a substrate having thereon a multiphoton curable photoreactive composition, a light source that emits a light beam comprising a plurality of wavelengths onto at least one region of the composition on the substrate, and a detector that detects a portion of light reflected from the composition to obtain a location signal with respect to the substrate, wherein the location signal is based at least on a wavelength of the reflected light.

25 Claims, 9 Drawing Sheets

U.S. PATENT DOCUMENTS

| | | | |
|---|---|---|---|
| 3,741,769 A | 6/1973 | Smith | |
| 3,779,778 A | 12/1973 | Smith | |
| 3,808,006 A | 4/1974 | Smith | |
| 4,249,011 A | 2/1981 | Wendling | |
| 4,250,053 A | 2/1981 | Smith | |
| 4,262,072 A | 4/1981 | Wendling | |
| 4,279,717 A | 7/1981 | Eckberg | |
| 4,394,403 A | 7/1983 | Smith | |
| 4,491,628 A | 1/1985 | Ito | |
| 4,642,126 A | 2/1987 | Zador | |
| 4,652,274 A | 3/1987 | Boettcher | |
| 4,668,601 A | 5/1987 | Kistner | |
| 4,859,572 A | 8/1989 | Farid | |
| 5,148,010 A * | 9/1992 | Mori | 250/201.5 |
| 5,235,015 A | 8/1993 | Ali | |
| 5,298,741 A * | 3/1994 | Walt et al. | 250/227.23 |
| 5,369,511 A * | 11/1994 | Amos | 359/15 |
| 5,384,238 A | 1/1995 | Ellis | |
| 5,512,219 A | 4/1996 | Rowland | |
| 5,545,676 A | 8/1996 | Palazzotto | |
| 5,718,497 A | 2/1998 | Yokoyama | |
| 5,753,346 A | 5/1998 | Leir | |
| 5,770,737 A | 6/1998 | Reinhardt | |
| 5,856,373 A | 1/1999 | Kaisaki | |
| 5,858,624 A | 1/1999 | Chou | |
| 5,859,251 A | 1/1999 | Reinhardt | |
| 5,998,495 A | 12/1999 | Oxman | |
| 6,025,406 A | 2/2000 | Oxman | |
| 6,100,405 A | 8/2000 | Reinhardt | |
| 6,215,095 B1 | 4/2001 | Partanen | |
| 6,262,140 B1 | 7/2001 | Savant | |
| 6,288,842 B1 | 9/2001 | Florczak | |
| 6,316,153 B1 | 11/2001 | Goodman | |
| 6,560,248 B1 | 5/2003 | Vernackt | |
| 6,674,572 B1 | 1/2004 | Scheruebl et al. | |
| 6,696,157 B1 | 2/2004 | David | |
| 6,713,718 B1 | 3/2004 | Lu | |
| 6,713,772 B2 * | 3/2004 | Goodman et al. | 250/492.1 |
| 6,750,266 B2 | 6/2004 | Bentsen | |
| 6,804,062 B2 | 10/2004 | Atwater | |
| 6,852,766 B1 | 2/2005 | DeVoe | |
| 6,855,478 B2 | 2/2005 | DeVoe | |
| 6,949,272 B2 | 9/2005 | Wochnowski | |
| 7,026,103 B2 * | 4/2006 | DeVoe et al. | 430/333 |
| 7,070,406 B2 | 7/2006 | Jeans | |
| 7,157,145 B2 | 1/2007 | Vissing | |
| 7,374,417 B2 | 5/2008 | Kuwabara | |
| 7,551,359 B2 * | 6/2009 | Murnan et al. | 359/629 |
| 7,563,013 B2 | 7/2009 | Lin | |
| 7,583,444 B1 | 9/2009 | DeVoe | |
| 7,887,889 B2 | 2/2011 | David | |
| 7,893,410 B2 * | 2/2011 | Sykora et al. | 250/492.1 |
| 8,109,665 B2 | 2/2012 | Lin | |
| 2002/0163619 A1 | 11/2002 | Matsuzawa | |
| 2002/0192569 A1 * | 12/2002 | Ulland et al. | 430/5 |
| 2002/0197051 A1 | 12/2002 | Tamura | |
| 2003/0006535 A1 | 1/2003 | Hennessey | |
| 2003/0139484 A1 | 7/2003 | Bentsen | |
| 2003/0155667 A1 | 8/2003 | Devoe | |
| 2003/0175525 A1 | 9/2003 | Wochnowski | |
| 2004/0067431 A1 | 4/2004 | Arney | |
| 2004/0145915 A1 | 7/2004 | Kim | |
| 2004/0180210 A1 | 9/2004 | Vissing | |
| 2004/0202865 A1 | 10/2004 | Homola | |
| 2004/0223385 A1 * | 11/2004 | Fleming et al. | 365/202 |
| 2004/0228112 A1 | 11/2004 | Takata | |
| 2005/0054744 A1 | 3/2005 | DeVoe | |
| 2005/0079295 A1 | 4/2005 | Schaepkens | |
| 2005/0133954 A1 | 6/2005 | Homola | |
| 2005/0147918 A1 | 7/2005 | Weber | |
| 2005/0254035 A1 * | 11/2005 | Frankel | 355/69 |
| 2005/0271794 A1 | 12/2005 | DeSimone | |
| 2005/0272599 A1 | 12/2005 | Kramer | |
| 2005/0273146 A1 | 12/2005 | DeSimone | |
| 2005/0287771 A1 | 12/2005 | Seamons | |
| 2006/0046156 A1 | 3/2006 | Amako | |
| 2006/0051048 A1 | 3/2006 | Gardiner | |
| 2006/0157444 A1 | 7/2006 | Nakamura | |
| 2006/0226566 A1 | 10/2006 | Kwak | |
| 2006/0231728 A1 | 10/2006 | Takamatsu | |
| 2006/0254894 A1 | 11/2006 | Jung | |
| 2006/0279025 A1 | 12/2006 | Heidari | |
| 2007/0018362 A1 | 1/2007 | Heidari | |
| 2007/0035843 A1 | 2/2007 | Cassarly | |
| 2007/0057031 A1 | 3/2007 | Lee | |
| 2007/0090278 A1 | 4/2007 | Botma | |
| 2007/0102844 A1 | 5/2007 | Simon | |
| 2007/0216049 A1 | 9/2007 | Rudmann | |
| 2007/0217181 A1 | 9/2007 | Chiu | |
| 2007/0264481 A1 | 11/2007 | DeSimone | |
| 2007/0271791 A1 | 11/2007 | Lai | |
| 2008/0007964 A1 | 1/2008 | Lin | |
| 2008/0083886 A1 | 4/2008 | Faklis | |
| 2008/0106001 A1 | 5/2008 | Slafter | |
| 2008/0196664 A1 | 8/2008 | David | |
| 2008/0319404 A1 | 12/2008 | Pekurovsky | |
| 2009/0061039 A1 | 3/2009 | Zhang | |
| 2009/0099537 A1 | 4/2009 | DeVoe | |
| 2009/0163127 A1 | 6/2009 | David | |
| 2009/0175050 A1 | 7/2009 | Marttila | |
| 2009/0213466 A1 | 8/2009 | Murnan | |
| 2009/0250635 A1 | 10/2009 | Sykora | |
| 2009/0279321 A1 | 11/2009 | Marttila | |
| 2009/0284840 A1 | 11/2009 | DeVoe | |
| 2009/0285543 A1 | 11/2009 | Marttila | |
| 2010/0227272 A1 | 9/2010 | DeVoe | |
| 2010/0239783 A1 | 9/2010 | Mao | |
| 2010/0288614 A1 | 11/2010 | Ender | |
| 2010/0294954 A1 | 11/2010 | Gates | |
| 2010/0308497 A1 | 12/2010 | David | |
| 2010/0308509 A1 | 12/2010 | David | |
| 2010/0316959 A1 | 12/2010 | Gates | |
| 2011/0001950 A1 | 1/2011 | DeVoe | |
| 2011/0090142 A1 | 4/2011 | You | |

FOREIGN PATENT DOCUMENTS

| | | |
|---|---|---|
| EP | 856592 | 8/1998 |
| JP | 60-160017 | 8/1985 |
| JP | 11-024081 | 1/1999 |
| JP | 2001-150451 | 6/2001 |
| KR | 10-2002-0088146 | 11/2002 |
| KR | 10-2007-0068852 | 7/2007 |
| WO | WO 98/21521 | 5/1998 |
| WO | WO 99/53242 | 10/1999 |
| WO | WO 01/96915 | 12/2001 |
| WO | WO 01/96952 | 12/2001 |
| WO | WO 01/96958 | 12/2001 |
| WO | WO 01/96961 | 12/2001 |
| WO | WO 02/05972 | 1/2002 |
| WO | WO 03/002269 | 1/2003 |
| WO | WO 2005/101466 | 10/2005 |
| WO | WO 2006/071914 | 7/2006 |
| WO | WO 2006/093963 A1 | 9/2006 |
| WO | WO 2007/051803 | 5/2007 |
| WO | WO 2007/073482 | 6/2007 |
| WO | WO 2007073482 A2 * | 6/2007 |
| WO | WO 2007/137102 | 11/2007 |

OTHER PUBLICATIONS

Anderson, "Close-up Imaging of Documents and Displays with Lens Arrays", Appl. Opt., Feb. 15, 1979, vol. 18, No. 4, pp. 477-484.

Baldacchini and Fourkas, "Fabrication and Metallization of Three-dimensional Microstructures", Materials Research Society Symposium Proceedings, 2004, vol. EXS-2, pp. M10.1.1-M10.1.3.

Dentinger, "Removal of SU-8 Photoresist for Thick Film Applications", Microelectronic Engineering, 2002, vol. 61-62, pp. 993-1000.

Duparre, "Artificial Compound Eyes—Different Concepts and Their Application to Ultra Flat Image Acquisition Sensors", MOEMS and Miniaturized Systems IV; Proceedings of SPIE, 2004, vol. 5346, pp. 89-100.

Duparre, "Microoptical Telescope Compound Eye", Optics Express, Feb. 7, 2005, vol. 13, No. 3, pp. 889-903.

Hembd-Solner, "Imaging Properties of the Gabor Superlens", J. Opt. A: Pure Appl. Opt., 1999, vol. 1, pp. 94-102.

Hinsberg, "Effect of Resist Components on Image Spreading During Postexposure Bake of Chemically Amplified Resists", Advances in Resist Technology and Processing XVII; Proceedings of SPIE, 2000, vol. 3999, pp. 148-160.

Korner, "New Approaches in Depth-scanning Optical Metrology", Proc of SPIE, Apr. 1, 2004, vol. 5457, pp. 320-333. XP009084995.

Lafratta and Fourkas, "Direct Laser Patterning of Conductive Wires on Three-dimensional Polymeric Microstructures", Chem. Mater., 2006, vol. 18, pp. 2038-2042.

Lel, "Local Thickness and Wave Velocity Measurement of Wavy Films with a Chromatic Confocal Imaging Method and a Fluorescence Intensity Technique", Experiments in Fluids, Nov. 1, 2005, vol. 39, pp. 856-864.

Maruo, "Three-dimensional Microfabrication with Two-photon-absorbed Photopolymerization," Opt. Lett., Jan. 15, 1997, vol. 22, No. 2, pp. 132-134.

Moon, Ford, and Yang, "Fabricating Three-dimensional Polymeric Photonic Structures by Multi-beam Interference Lithography", Polymers for Advanced Technologies, Feb. 2006, vol. 17, No. 2, pp. 83-93.

Piestrup, "Large Area X-ray and Neutron Imaging Using Three-dimensional Arrays of Microlenses", Rev. of Sci. Inst., Nov. 2004, vol. 75, No. 11, pp. 4769-4774.

Shaoulov, "Compact Microlenslet-array-based Magnifier", Opt. Lett., Apr. 1, 2004, vol. 29, No. 7, pp. 709-711.

Shaoulov, "Magnifying Miniature Displays with Microlenslet Arrays", Helmet- and Head-Mounted Displays IX: Technologies and Applications; Proceedings of SPIE, 2004, vol. 5442, pp. 246-253.

Shi, "Chromatic Confocal Microscopy Using Supercontinuum Light", Optics Express, May 17, 2004, vol. 12, No. 10, pp. 2096-2101.

Tanaka, Ishikawa and Kawata, "Two-photon-induced Reduction of Metal Ions for Fabricating Three-dimensional Electrically Conductive Metallic Microstructure", Appl. Phys. Lett., 2006, vol. 88, pp. 81107-1-81107-3.

EP Search Report for App. No. 08837450 and PCT/US2008/078724, 7 pgs.

International Search Report for PCT/US2008/078724, 3 pgs.

Written Opinion of the ISA for International Application No. PCT/US2008/078724, 3 pgs.

Allen, "193 nm Single Layer Positive Resists Building Etch Resistance into a High Resolution Imaging System", SPIE, 1995, vol. 2438, pp. 474-485.

Allen, "High Performance Acrylic Polymers for Chemically Amplified Photoresist Applications", J. Vac. Sci. Tech. B, Nov./Dec. 1991, vol. 9, No. 6, pp. 3357-3361.

Beck, "Improving Stamps for 10 nm Level Wafer Scale Nanoimprint Lithography", Microelectr. Eng., 2002, vol. 61-62, pp. 441-448.

Beringer, "Diaryliodonium Salts, IX. The Synthesis of Substituted Diphenyliodonium Salts", J. Am. Chem. Soc., 1959, vol. 81, pp. 342-351.

Bongiovanni, "UV-curable Systems Containing Perfluoropolyether Structures: Synthesis and Characterization", Macromol. Chem. Phys., 1997, vol. 198, pp. 1893-1907.

Braun, "Polymer Replication of 3D Microstructures Employing a High Content Fluorine Separation Layer", Appl. Surf. Sci., 1999, vol. 138-139, pp. 206-211.

Chang, "A Roller Embossing Process for Rapid Fabrication of Microlens Arrays on Glass Substrates", Microsyst. Technol., Feb. 2006, vol. 12, pp. 754-759.

Eaton, "Dye Sensitized Photopolymerization", Advances in Photochemistry, 1986, vol. 13, pp. 427-487.

Groning, "'Self-thickness-limited' Plasma Polymerization of an Ultrathin Antiadhesive Film", J. Vac. Sci. Tech. A., Nov./Dec. 1996, vol. 14, No. 6, pp. 3043-3048.

Houle, "Antiadhesion Considerations for UV Nanoimprint Lithography", Applied Physics Letters, 2007, vol. 90, No. 213103, pp. 213103-1-213103-3.

Jaszewski, "Properties of Thin Anti-adhesive Films Used for the Replication of Microstructures in Polymers", Microelectr. Eng., 1997, vol. 35, pp. 381-384.

Jung, "Vapor-phase Self-Assembled Monolayer for Improved Mold Release in Nanoimprint Lithography", Langmuir, 2005, vol. 21, pp. 1158-1161.

Kim, "A Simple Fabrication Route to a Highly Transparent Superhydrophobic Surface with a Poly(dimethylsiloxane) Coated Flexible Mold", Chem. Commun., 2007, pp. 2237-2239.

Large, "The Use of Electrochemical Potential Data in Studies of Spectral Sensitization", Photographic Sensitivity, R.J. Cox, ed., Academic Press, Chapter 15, pp. 241-264, (1973).

Lee, "Antiadhesion Surface Treatments of Molds for High-Resolution Unconventional Lithography", Adv. Mater., 2006, vol. 18, pp. 3115-3119.

Lee, Handbook of Epoxy Results (1967).

Lee, "Self-Assembled Monolayer as an Antiadhesion Layer on a Nickel Nanostamper in the Nanoreplication Process for Optoelectronic Applications", Applied Physics Letters, 2006, vol. 88, No. 073101, pp. 073101-1-073101-3.

Li, "Multiphoton Polymerization", Materials Today, Jun. 2007, vol. 10, No. 6, pp. 30-37.

Mann, Electrochemical Reactions in Nonaqueous Systems, (1970).

Park, "Fabrication of Nano-precision PDMS Replica Using Two-photon Photopolymerization and Vacuum Pressure Difference Technique", Bull. Korean Chem. Soc., 2004, vol. 25, No. 8, pp. 1119-1120.

Peng, "High Fidelity Fabrication of Microlens Arrays by Nanoimprint Using Conformal Mold Duplication and Low-pressure Liquid Material Curing", J. Vac. Sci. Technol. B, Mar./Apr. 2007, vol. 25, No. 2, pp. 410-414.

Smith, Modern Optical Engineering: The Design of Optical Systems, 1966, pp. 104-105.

Wang, "Polybenzoxazine as a Mold-release Agent for Nanoimprint Lithography", Langmuir, 2007, vol. 23, pp. 5868-5871.

Weinberg, Techniques of Chemistry, vol. 5, Part II, Technique of Electroorganic Synthesis, (1975).

Xu, "Measurement of Two-photon Excitation Cross Sections of Molecular Fluorophores with Data from 690 to 1050 nm", J. Optical Soc. Am. B, Mar. 1996, vol. 13, No. 3., pp. 481-491.

Zhou, "An Efficient Two-photon-Generated Photoacid Applied to Positive-tone 3D Microfabrication", Science, May 10, 2002, vol. 296, pp. 1106-1109.

\* cited by examiner

CHROMATIC CONFOCAL SENSOR

Cross Reference to Related Applications

This application is a national stage filing under 35 U.S.C. 371 of PCT/US2008/078724, filed on Oct. 3, 2008, which claims priority to U.S. patent application Ser. No.60/979,240, filed on Oct. 11, 2007, the disclosure of which is incorporated by reference in its/their entirety herein.

TECHNICAL FIELD

The present disclosure relates to methods and apparatus for detecting the plane of focus in a confocal microscopy system.

BACKGROUND

Confocal sensors are used in microscopy systems to map a three-dimensional image point by point or to provide highly discriminative surface location information on a two-dimensional image plane. In the latter application, a suitable illumination source, such as a laser, is commonly used to create the highly discriminative focus.

As shown in FIG. 1, narrowband illumination 20 is emitted from a source 12 and passes through an optical system 10. Narrowband illumination 20 passes through a beamsplitter 22 and an objective lens 14. Objective lens 14 focuses narrowband illumination 20 at a distance 26 beyond lens 14. When a surface is located at this focus, narrowband illumination 12 is retro-reflected back through optical system 10 to beamsplitter 22, where it is reflected and brought into focus provided that the slope of surface 16 is sufficiently small such that the retro-reflected illumination completely or partially returns through optical system 10. The light then passes through a pinhole 24 and its intensity is detected by a detector 18.

Pinhole 24 acts as a spatial filter, which prevents any out of focus light from passing through pinhole 24 and being detected. Furthermore, since the focus point of the microscope objective and the pinhole are conjugates of an optical system, only a single on-axis focal point of the microscope objective will pass through the pinhole onto detector 18. All other light is rejected due to the small size, typically on the order of a micrometer, of pinhole 24.

With the confocal imaging system described in FIG. 1, using only intensity information at detector 18, it is difficult for a user to determine whether the focus is positioned on side 16a or 16b of surface 16 when not exactly focused on surface 16. The signal generated by detector 18 will be similarly weak when the focus point is on side 16a or 16b, since the output signal of detector 18 provides no inherent directional information.

In addition to the lack of directional information, the confocal imaging system of FIG. 1 produces a sharp signal that is strong when the surface is in focus, but quickly drops off when the surface is not in focus.

Thus a confocal imaging system that allows earlier detection of the intensity signal, and thus enables more efficient focusing, is desired.

SUMMARY

The present invention is generally related to confocal microscopy.

In one aspect, the present disclosure is directed to a system including a substrate having thereon a multiphoton curable photoreactive composition, a light source that emits a light beam comprising a plurality of wavelengths onto at least one region of the composition on the substrate, and a detector that detects a portion of light reflected from the composition to obtain a location signal with respect to the substrate, wherein the location signal is based on at least a wavelength of the reflected light.

In some embodiments, the system includes a second light beam emitted from a second light source, and the second light beam at least partially cures a region of the multiphoton curable photoreactive composition.

In certain embodiments, the system includes a fiber optic cable which directs the reflected light to the detector.

In some preferred embodiments, the system includes at least two fiber optic cables which may direct the reflected light to the detector, wherein at least one of the fiber optic cables comprises a diameter different than the diameter of at least one other of the fiber optic cables.

In another aspect, the disclosure is directed to a method including providing a substrate having thereon a multiphoton curable photoreactive composition, applying at least one light beam comprising a plurality of wavelengths to at least one region of the material, wherein at least one of the wavelengths comprises a sufficient intensity to at least partially cure the multiphoton curable photoreactive composition, and processing a portion of the light reflected off the material to obtain a location signal with respect to the substrate, wherein the location signal comprises the wavelength of the reflected light.

In some embodiments, the at least one light beam comprises a first light beam and a second light beam. In certain preferred embodiments, the first light beam comprises the at least one of the wavelengths which comprises a sufficient intensity to at least partially cure the multiphoton curable photoreactive composition, and the second light beam comprises the portion of the light beam reflected off the material to obtain a location signal with respect to the material.

In other embodiments, a single light beam comprises the at least one of the wavelengths which comprises a sufficient intensity to at least partially cure the multiphoton curable photoreactive composition and the portion of the light beam reflected off the material to obtain a location signal with respect to the material.

In certain embodiments, the step of applying at least one light beam comprises introducing chromatic aberration into the at least one light beam.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
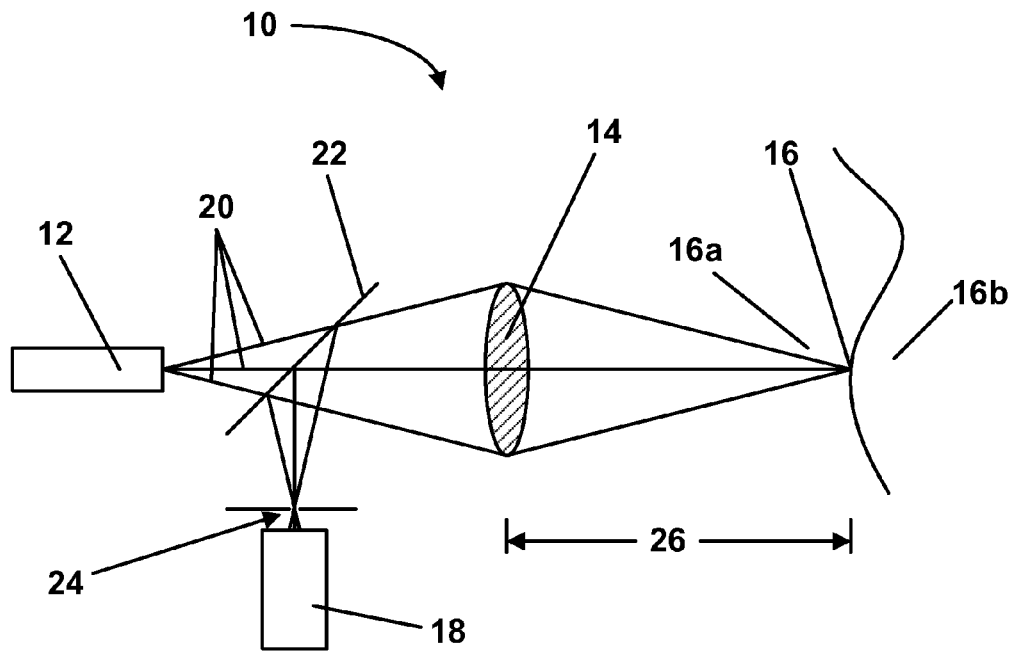
FIG. 1 is a schematic diagram illustrating a confocal sensor.
Figure 2:
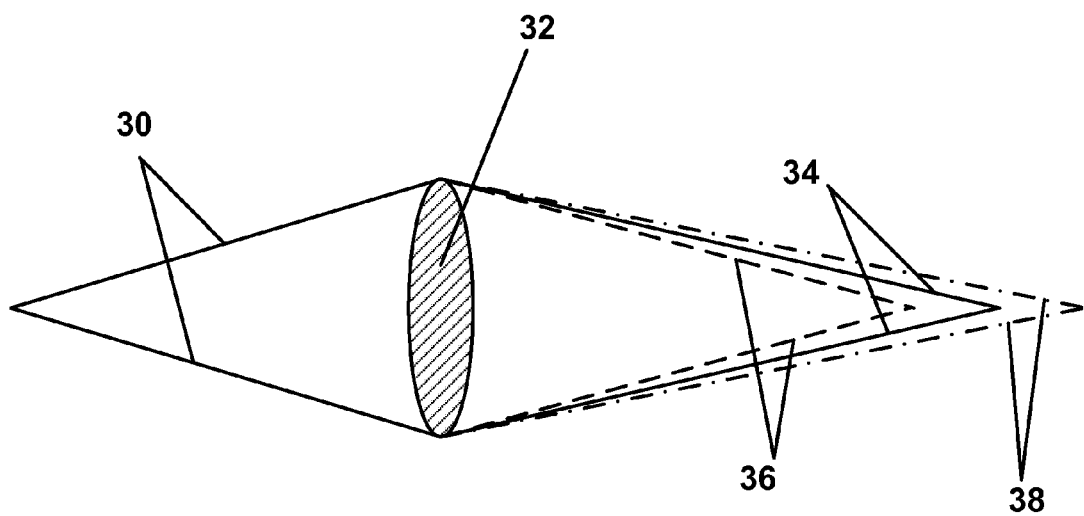
FIG. 2 is a diagram illustrating an example of longitudinal chromatic aberration.

FIG. 2 shows a light 30 passing through a lens 32. If lens 32 is made of a single material, longitudinal chromatic aberration may result. Alternatively, lens 32 may be constructed out of more than one material to produce or even magnify the longitudinal chromatic aberration. Longitudinal chromatic aberration causes different wavelengths of light 34, 36, 38 to focus at focal planes different distances from lens 32. Specifically, longer wavelengths of light 38 will refract less as they pass through lens 32, and as a result, will be focused farther from lens 32 than shorter wavelengths of light 36.

Figure 3:
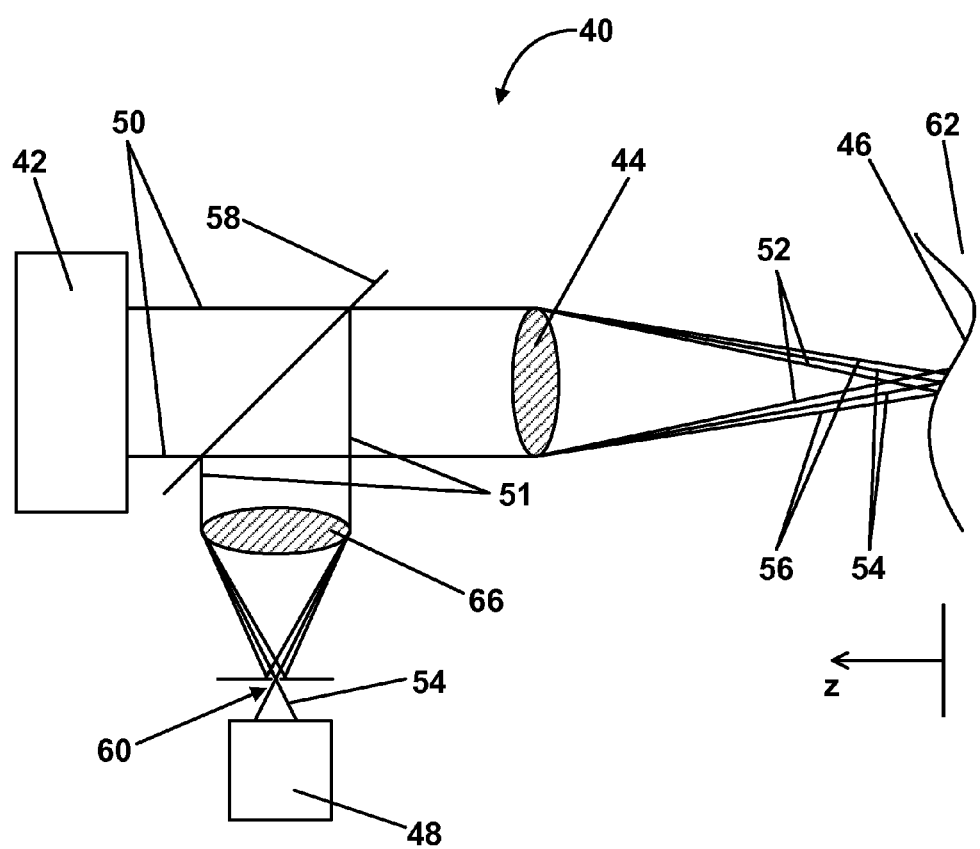
FIG. 3 a schematic diagram of a chromatic confocal sensor.

FIG. 3 is directed to an illustrative system 40 including a chromatic confocal sensor. Light 50 with a plurality of wavelengths is emitted by a light source 42. In the illustrated embodiment, light 50 is collimated when it impinges on lens 44. In other embodiments, light 50 may not be collimated when it impinges on lens 44. Any light source 42, or a plurality of light sources, may be used that emits light 50 with a sufficient number of wavelengths to enable discrimination between the wavelengths at a detector 48. One suitable light source 42 is, for example, a fiber-coupled broadband superluminescent LED. Light 50 then passes through a beamsplitter 58 and an objective lens 44. Objective lens 44 is designed to produce longitudinal chromatic aberration, which causes the light with different wavelengths 52, 54, 56 to focus different distances away from objective lens 44. In other embodiments, objective lens 44 may not produce longitudinal chromatic aberration, but other, optional components of the optical system, such as other lenses, collimation elements, polarizers, and the like, may introduce longitudinal chromatic aberration. As described briefly above in FIG. 2, the light 50 with the longest wavelength 56 will be focused at a focal plane the farthest distance from lens 44. Conversely, light with the shortest wavelength 52 will be focused at a focus plane closest to lens 44. Light of intermediate wavelengths 54 will be focused at intermediate focal planes between those of light having the longest wavelength 56 and light having the shortest wavelength 52.

At least one of the plurality of wavelengths 52, 54, 56 is focused at a surface 46 of a material 62, which is conjugate with filter 60. In this example, surface 46 of a material 62 is conjugate with the filter for wavelength 54. In other embodiments, surface 46 may be an interface of two materials, as will be described below with reference to FIG. 5. In some cases, surface 46 may be an internal surface of material 62. Other wavelengths 52 and 56 may be focused in the positive z-direction above surface 46 or in the negative z-direction beyond surface 46. At least a portion of light 50 that is incident on material 62 is retro-reflected from surface 46 and returns through objective lens 44, where it is collimated. Retro-reflected light 51 then reflects off beam splitter 58 and is focused proximate filter 60. Only the wavelength of light 54 that is in focus at surface 46 is allowed to pass through filter 60 to detector 48.

In some embodiments, such as the embodiment shown in FIG. 3, lens 44 may be constructed to adjust in the positive and negative z-direction. In other embodiments, the entire optical system (including lens 44 and all optical elements upstream of lens 44) may be constructed to move. In yet other embodiments, material 62 may be operatively connected to a moveable stage. This allows the relative distance from lens 44 to surface 46 to be changed, which changes the relative position of light 50 and surface 46. The distance from lens 44 to surface 46 affects which wavelength of light will be focused at surface 46. As lens 44 is moved closer to surface 46, shorter wavelengths of light 52 will be in focus at surface 46. Conversely, as lens 44 is moved away from surface 46, longer wavelengths of light 56 will be in focus at surface 46. As the wavelength of light that is in focus at surface 46 changes, the wavelength of light detected by detector or detectors 48 will also change. Thus, the wavelength of the light detected by detector or detectors 48 indicates which wavelength of light is in focus at surface 46.

Objective lens 44 may also be designed to provide more or less longitudinal chromatic aberration, depending on the desired application. For example, if the longitudinal chromatic aberration is designed to be large, the individual wavelengths can be focused at focal planes over a relatively large distance in the z-direction, and a signal can be detected relatively large distances above or below the desired focal point at the interface. Alternatively, if the longitudinal chromatic aberration is designed to be small, more precise positioning of the focus planes relative to the interface can be achieved.

Objective lens 44 may be constructed of one material or a plurality of materials. In addition, objective lens 44 may include one or more lenses. Also, refractive, reflective and diffractive surfaces may be combined to extend the longitudinal chromatic aberration of lens 44. The amount of longitudinal chromatic aberration may be tailored by utilizing one or more of these exemplary elements.

In addition to the construction of objective lens 44, system 40 may be tailored to specific applications by selecting the range of wavelengths emitted from source 42. For example, if source 42 emits a relatively narrow range of wavelengths, system 40 may have a smaller range in the z direction than if a relatively wide range of wavelengths is emitted by source 42.

The construction of filter 60 may also vary widely depending on the desired application. Filter 60 may work in conjunction with lens 44 and source 42 to provide the available range and resolution of measurements. In one embodiment, an aperture in a sheet of material, also known as a pinhole, provides spatial filtering. The pinhole typically has a diameter on the order of tens of microns, and the size of the pinhole determines the discrimination of filter 60. In other words, the smaller the diameter of the pinhole, the more discriminative the filtering.

In one embodiment, a fiber optic cable is used as the filter 60, either alone, or in combination with a pinhole. Either a multimode fiber optic cable or a single mode fiber optic cable may be used, depending on the amount of discrimination desired. Similar to the spatial filter, the fiber optic cable may be selected to provide the discrimination desired. For example, in general, a single mode fiber optic cable is more discriminative than a multimode cable. Additionally, the diameter of the multimode fiber optic cable may be chosen to further tailor the level of discrimination. If a single mode fiber optic cable is chosen with a sufficiently small diameter, the system may be made to act like a confocal sensor that detects a small subset of the narrowband wavelength of light.

In another embodiment, at least two fiber optic cables may be used simultaneously in concert with a beam splitter to direct a portion of retroreflected light 51 to a respective one of at least two detectors 48. As one example, a beam splitter may split retroreflected light 51 into two beams, and may direct one beam to a multimode fiber optic cable, which carries the light to one detector. This signal includes a relatively wide band of wavelengths, and may allow detection of retroreflected light 51 that is of a significantly longer or shorter wavelength than the wavelength that is desired to be in focus at the interface. The second beam produced by the beam splitter may be directed to a single mode fiber optic cable, which directs this portion of retroreflected light 51 to a second detector. The second detector, which receives a relatively narrow band of wavelengths, may be used for fine focusing of the specific wavelength of light that is in focus at surface 46.

In yet another embodiment, two fiber optic cables that discriminate retroreflected light 51 differently, i.e. one fiber is more discriminative than the other, may be used sequentially. For example, a less discriminate fiber optic cable may be used initially to provide a rough positioning of the wavelength of light in focus at interface 46, then a more discriminate fiber optic cable may be switched into use to provide more precise positioning of the wavelength of light in focus at surface 46.

Detector or detectors 48 may detect the light intensity, power, beam size, the wavelength of the light, and the like. Any suitable detector may be used, including, but not limited to, a human eye, a CCD or equivalent detector, a spectrometer, and the like. In one embodiment, a spectrometer is used to detect both light intensity and wavelength. The wavelength of the light that passes through filter 60 and is detected by detector 48 indicates which wavelength of light is focused at surface 46.

In one embodiment, it is desirable to focus a specific wavelength at interface 46. In this embodiment, a detector 48 that detects the wavelength of light that is discriminated by filter 60 can be used to determine the relative position of the focus plane of the desired wavelength of light with respect to surface 46. For example, if light with a longer wavelength than the desired focus light is detected by detector 48, the desired wavelength of light is focused above the interface. Alternatively, if light with a shorter wavelength than the desired wavelength of light is detected by detector 48, the desired wavelength of light is focused below the interface.

The light intensity in conjunction with the wavelength may also be used to determine the location of surface 46. For example, if a highly discriminating filter 60 is used so that only a small number of wavelengths of light are passed to detector 48, a spike in the measured intensity may signal the focal plane of the light is located at surface 46. The light intensity may also provide useful information if a less discriminating filter 60 is used. For example, in one embodiment, a light source 42 is used that emits a light band 50 with an intensity that is a function of the wavelength, i.e. the intensity is not uniform across the range of wavelengths emitted. If the relative intensity of the various emitted wavelengths is known, the relative intensity detected by the detector may also be used to aid in focusing the desired wavelength at the desired z-position.

Figure 4A:
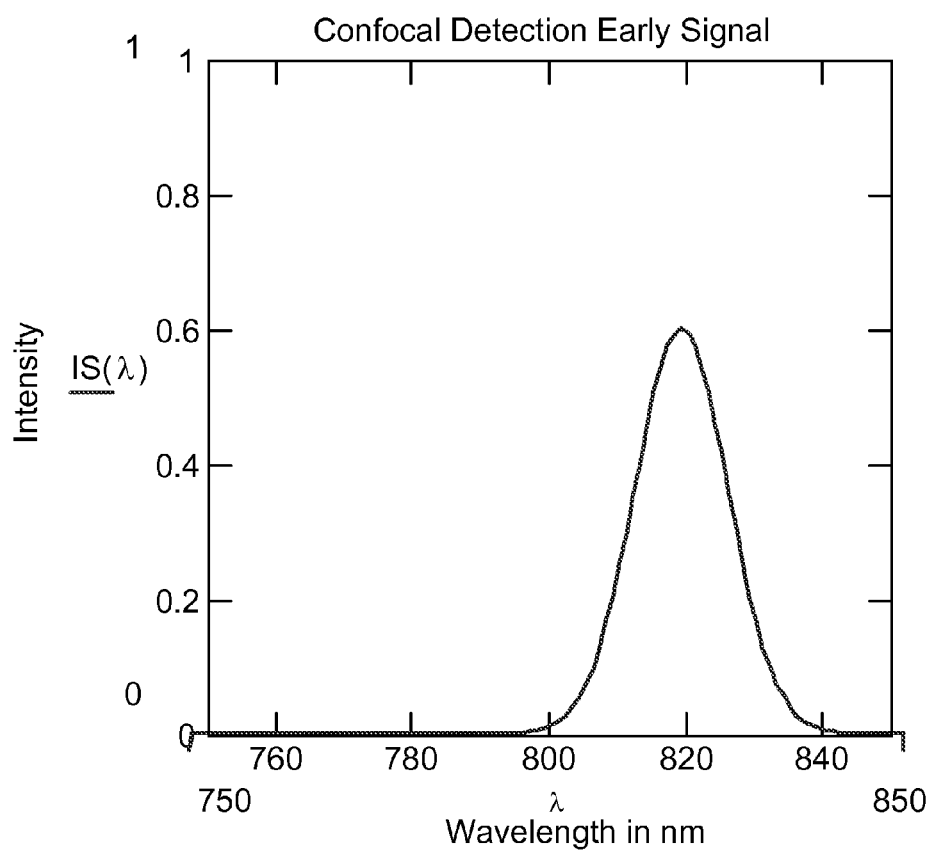
FIGS. 4A-4C are plots of intensity versus wavelength for in focus, above focus and below focus reflective points derived from a confocal sensor.
Figure 4B:
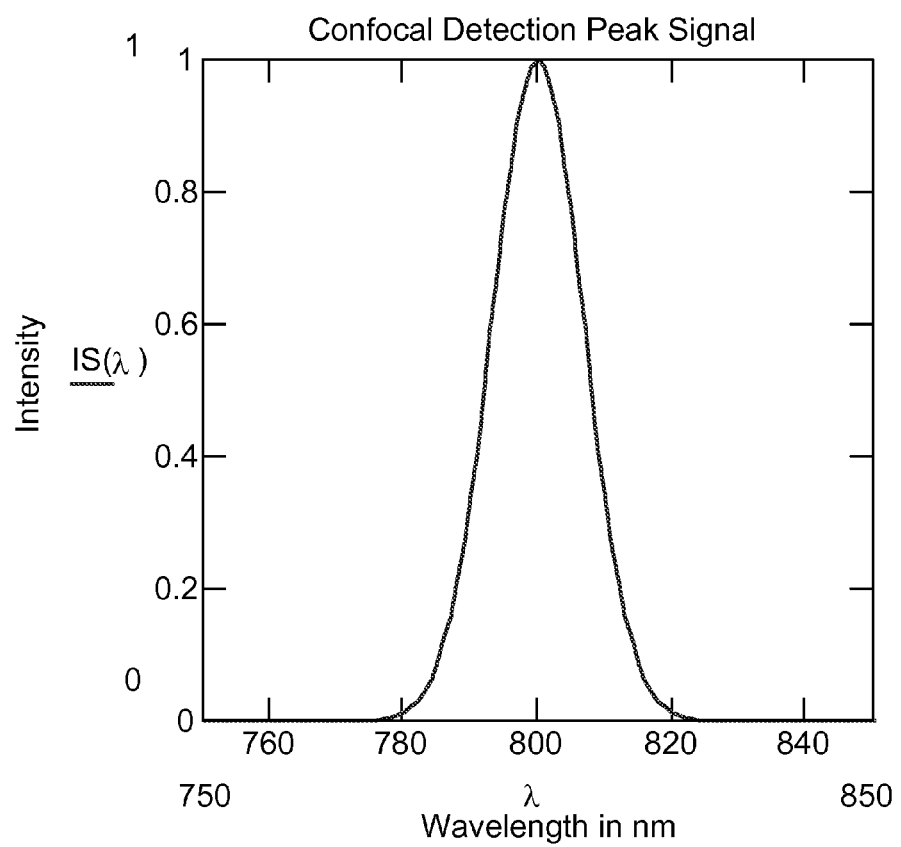
Figure 4C:
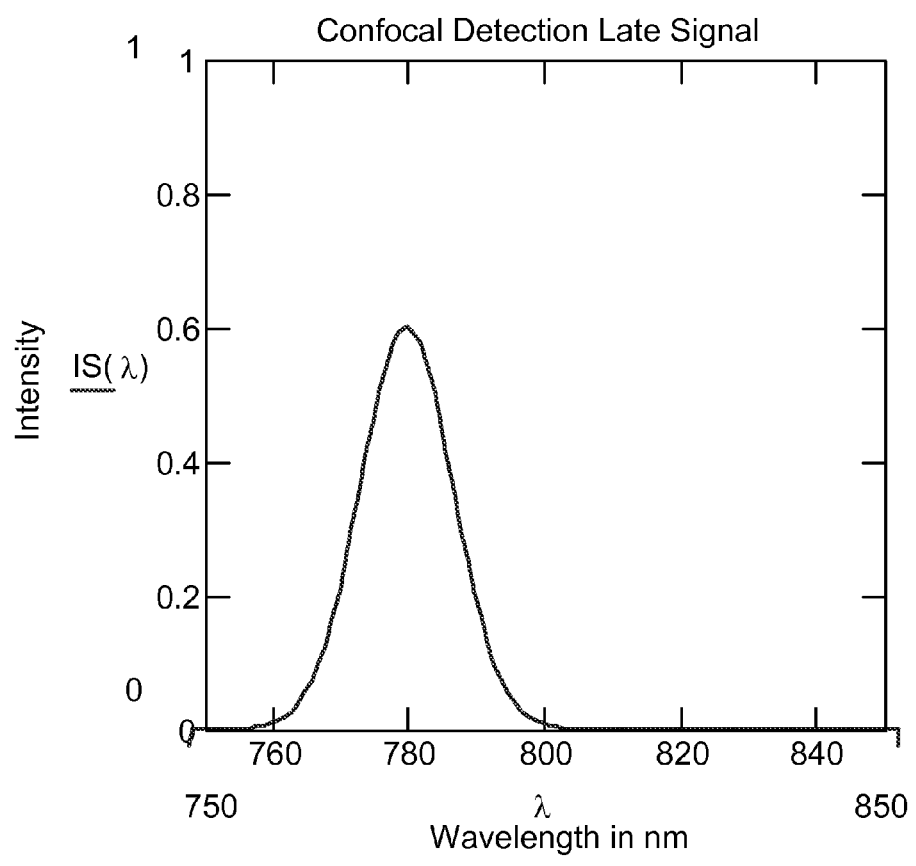

FIGS. 4A-4C provide some non-limiting examples of the use of a chromatic confocal sensor as described above. In FIGS. 4A-4C, light incident on a surface includes wavelengths ranging from 750 nm to 850 nm. In this example, the optical system is at the desired focus position when the 800 nm wavelength light is focused at surface 46. FIG. 4A, then, shows a case where the in focus light has a longer wavelength, about 820 nm, than the desired focus. This indicates that surface 46 is farther from the lens than needed to bring the 800 nm light into focus at surface 46. Alternatively, FIG. 4C shows a case when surface 46 is closer to the objective lens than is necessary to bring the light with a wavelength of 800 nm into focus at surface 46. In this case, the light detected by the chromatic confocal sensor has a wavelength 780 nm, or shorter than the desired wavelength. FIG. 4B, then, shows the case where the 800 nm wavelength light is in focus at surface 46, as desired.

FIG. 4B also shows the intensity of the desired wavelength of light as being greater than that of the wavelengths of light shown in FIGS. 4A and 4C. As discussed above, the emitted light intensity may or may not be a function of the wavelength within a band of wavelengths. In the example shown in FIGS. 4A-4C, the intensity of the emitted light is greater at 800 nm than at either 780 nm or 820 nm. Thus, the intensity of the retro-reflected light when the 800 nm wavelength is focused at surface 46 is greater than the intensity of the retro-reflected light when either the 780 nm wavelength or 820 nm wavelength is focused at surface 46.

In another embodiment, a layer of a second material may be provided on material 62 of FIG. 3. The second material may be any material that can be processed using any light source of sufficient intensity. In a preferred embodiment, an ultrafast laser, such as a femtosecond or picosecond laser, may be used to process the second material. In this embodiment, two light beams may be used. The first beam, the interrogating beam, is used to determine a location in or on the material as described above using a chromatic confocal sensor. The second light beam, for example an ultrafast laser, is then used to process the material based on the location determined by the interrogating beam and the chromatic confocal sensor. Alternatively, a single light beam may act as both the interrogating beam and the processing beam.

In another embodiment, the layer of the second material may be a multiphoton curable photoreactive composition. An example apparatus that is useful for curing a multiphoton curable photoreactive composition and utilizes a chromatic confocal sensor will be described below with reference to FIG. 5.

Substrate 62 in FIG. 3 may be any suitable material. In one embodiment, silicon is used as substrate 62.

It is envisioned that more than one light beam and/or chromatic confocal sensor may be utilized at the same time. In one example, a high throughput imaging system may be designed using multiple light beams and/or chromatic confocal sensors. The system may produce 3-dimensional images in a shorter amount of time by utilizing the outputs of each sensor to form one master composite image. Alternatively, multiple light beams and sensors may be used to provide more accurate information about the location of the interface between the layer and the surface. In one example, three or more light beams and chromatic confocal sensors may be used to simultaneously determine the location of the interface at three or more regions of the substrate. This information may then be used to position the optical system or substrate in the desired position to facilitate subsequent processing.

Figure 5:
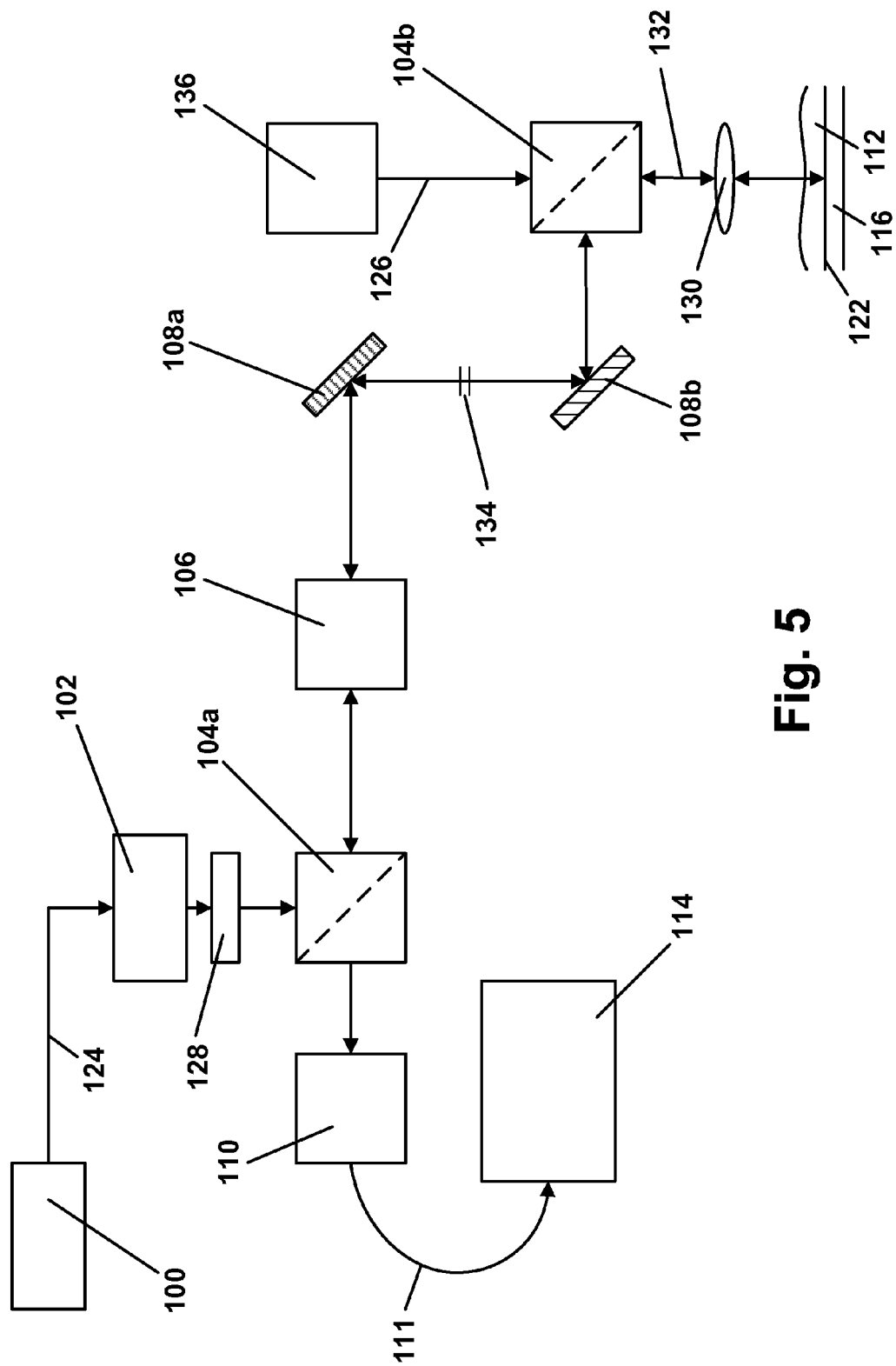
FIG. 5 is a schematic diagram of an apparatus with a chromatic confocal sensor suitable for processing a multiphoton curable photoreactive material.

Referring now to FIG. 5, an embodiment is illustrated in which a chromatic confocal sensor is utilized as a part of a system for curing a multiphoton curable photoreactive composition. In this process a photoreactive composition can be exposed to light under conditions such that multiphoton absorption occurs, which causes in a region of the layer a change in its chemical or physical properties. Examples of such changes include polymerization, crosslinking, and/or a change in solubility characteristics (for example, lesser or greater solubility in a particular solvent) as compared to the photoreactive composition prior to exposure. Such exposure can be accomplished by any known means capable of achieving sufficient intensity of the light, but a focused light source from an ultrafast laser is typically used. Preferably, a femtosecond laser may be used to provide the curing light.

In operation of the system according to this embodiment, interrogation light 124 is emitted from an interrogation illumination source 100, which is operatively connected to a collimation package 102. As stated above, the interrogation light source may be any source that emits a band of wavelengths wide enough to be discriminated at the filter/detector. A suitable interrogation illumination source 100 includes a fiber-coupled broadband superluminescent LED. The connection between interrogation illumination source 100 and collimation package 102 may be accomplished using, for example, a fiber optic cable. Collimation package 102 collimates, or makes parallel, interrogation light 124. The elements of the collimation package 102 may or may not introduce at least some chromatic aberration.

Interrogation light 124 then passes through a linear polarizer 128, where it is polarized, i.e. only light with wave vibrations in one plane or direction is allowed to pass. Next, interrogation light 124 is reflected off a polarizing beamsplitter 104*a*. Interrogation light 124 then passes through a rotator 106, where it experiences a net polarization rotation of 0 (zero) degrees. Interrogation light 124 is then reflected off two fold mirrors 108*a*, 108*b* and is reflected off a second polarizing beam splitter 104*b*. As indicated by parallel lines 134, the view in FIG. 5 is rotated by 90 degrees (into or out of the page) between elements 108*a* and 108*b*.

At this point, a curing light 126 emitted by a second light source 136 may be axially added to interrogation light 124. Curing light 126 may be any light that is capable of providing a sufficient intensity of light to at least partially cure a region of the photoreactive composition to form a cured object. In a preferred embodiment, an ultrafast laser source may be used to at least partially cure a region of the multiphoton curable photoreactive composition. This combined beam 132 is directed through objective lens 130 which may introduce more longitudinal chromatic aberration.

Interrogation light 124 includes multiple wavelengths, and may include the wavelength of curing light 126. Alternatively, if the optical system is sufficiently well characterized, interrogation light 124 may not include the wavelength of the curing light. In a preferred embodiment, interrogation light 124 includes the wavelength of curing light 126. This facilitates focusing of curing light 126 at or near interface 122. At least one of the multiple wavelengths is focused at interface 122 of substrate 116 and layer 112. Interrogation light 124 and curing light 126 have cross polarization components, so they will take separate paths on their return after being retroreflected off interface 122. Retro-reflected curing light 126 will pass through the polarizing beam splitter 104*b* instead of being reflected. Retro-reflected interrogation light 124 will be reflected by polarizing beam splitter 104*b* and return through the optical system. The retro-reflected light receives a net polarization rotation of 90 degrees at rotator 106. This allows the light to pass through polarizing beam splitter 104*a* and be focused on a fiber optic cable 111 by a focusing lens in box 110. The focusing lens in box 110 may or may not introduce more chromatic aberration, depending on the design and construction of the lens, as described above. Fiber optic cable 111 discriminates the light, as described above. The light then enters a spectrometer 114. Spectrometer 114 detects the wavelength and intensity of the retro-reflected light, and may display the collected information to a user, or send the information to a controller (not shown in FIG. 5).

As noted above, the band of wavelengths of interrogation light 124 may include the wavelength of curing light 126. Thus, because interrogation light 124 and curing light 126 are focused by the same objective lens 130, when the peak wavelength detected by spectrometer 114 matches the peak wavelength of curing light 126, curing light 126 is in focus at interface 122. In addition, if the peak wavelength of light detected by the spectrometer 114 is shorter than the peak wavelength of curing light 126, curing light 126 is focused beyond interface 122. Alternatively, if the peak wavelength of light detected by spectrometer 114 is longer than the peak wavelength of curing light 126, curing light 126 is focused above interface 122. In this way, the wavelength of light detected by spectrometer 114 may be used to focus curing beam 126 at the desired location.

Because interrogation light 124 and curing light 126 are incident upon interface 122 at the same time in the same location, very accurate information regarding the location of interface 122 with respect to the focal plane of curing light 126 may be obtained. The curing of the multiphoton curable photoreactive composition in layer 112 may occur concurrently with the location of interface 122, or may occur after the location of interface 122, if curing light 126 is not added until after interface 122 is located.

Figure 6:
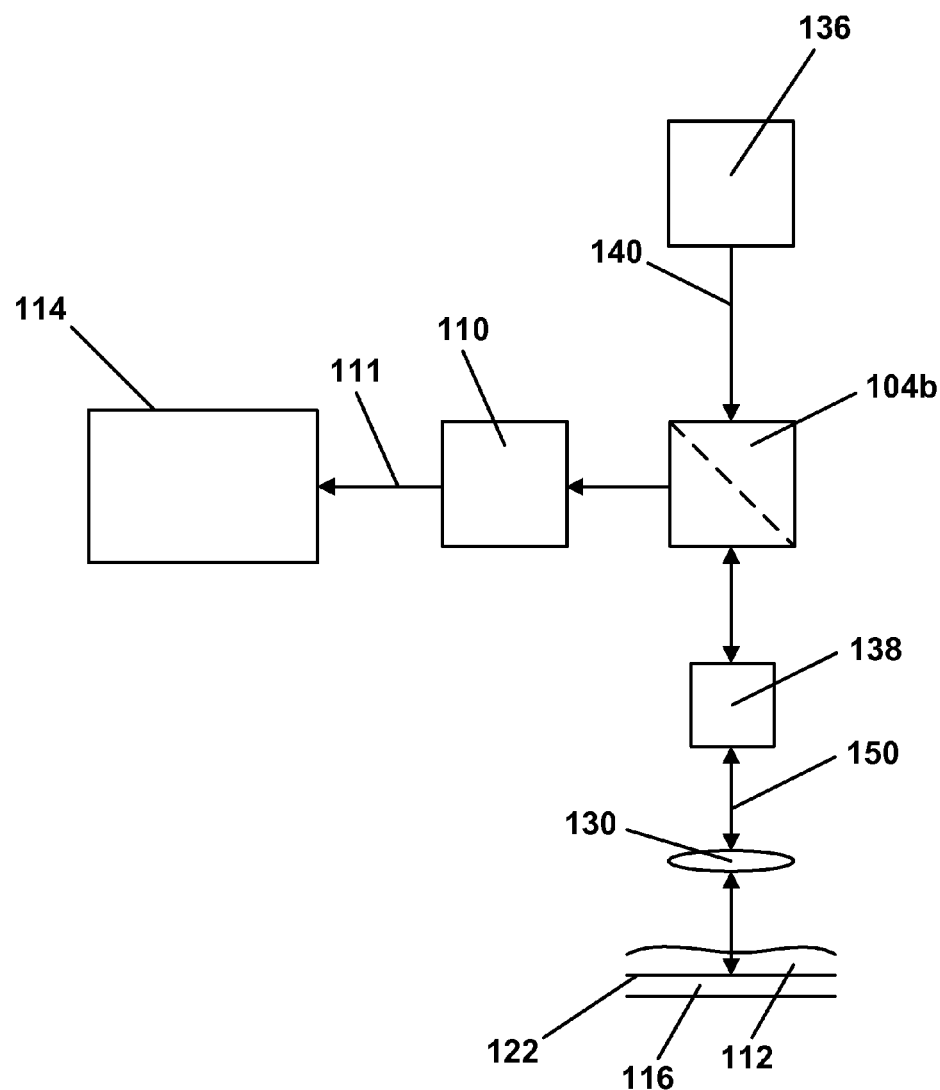
FIG. 6 is a schematic diagram of an apparatus suitable for processing a multiphoton curable photoreactive material that utilizes a chromatic confocal sensor.

In an alternative embodiment shown in FIG. 6, a light 140 emitted from second light source 136 acts as both interrogation light 124 and curing light 126. Light 140 passes through polarizing beam splitter 104*b* and a suitable quarter wave retardation element, such as quarter wave plate 138, which produces circularly polarized light. Light 140 then passes through objective lens 130 and is focused proximate interface 122 between layer 112 and substrate 116. A portion of light 140 that is in focus at interface 122 and is not absorbed is retroreflected off interface 122 and travels back through objective lens 130. The retroreflected light 150 passes back through quarter wave plate 138, which produces linearly polarized light rotated 90° relative to light 140, to polarizing beam splitter 104*b*, where retroreflected light 150 is reflected and directed to a lens in box 110. The lens in box 110 focuses retroreflected light 150 onto fiber optic cable 111, which directs retroreflected light 150 to detector 114.

In other embodiments, quarter wave plate 138 is not necessary. For example, light 140 passing through a lens with a sufficiently high numerical aperture may experience some polarization rotation, which may provide sufficient intensity of retroreflected light 150 to be detected by detector 114.

Figure 7:
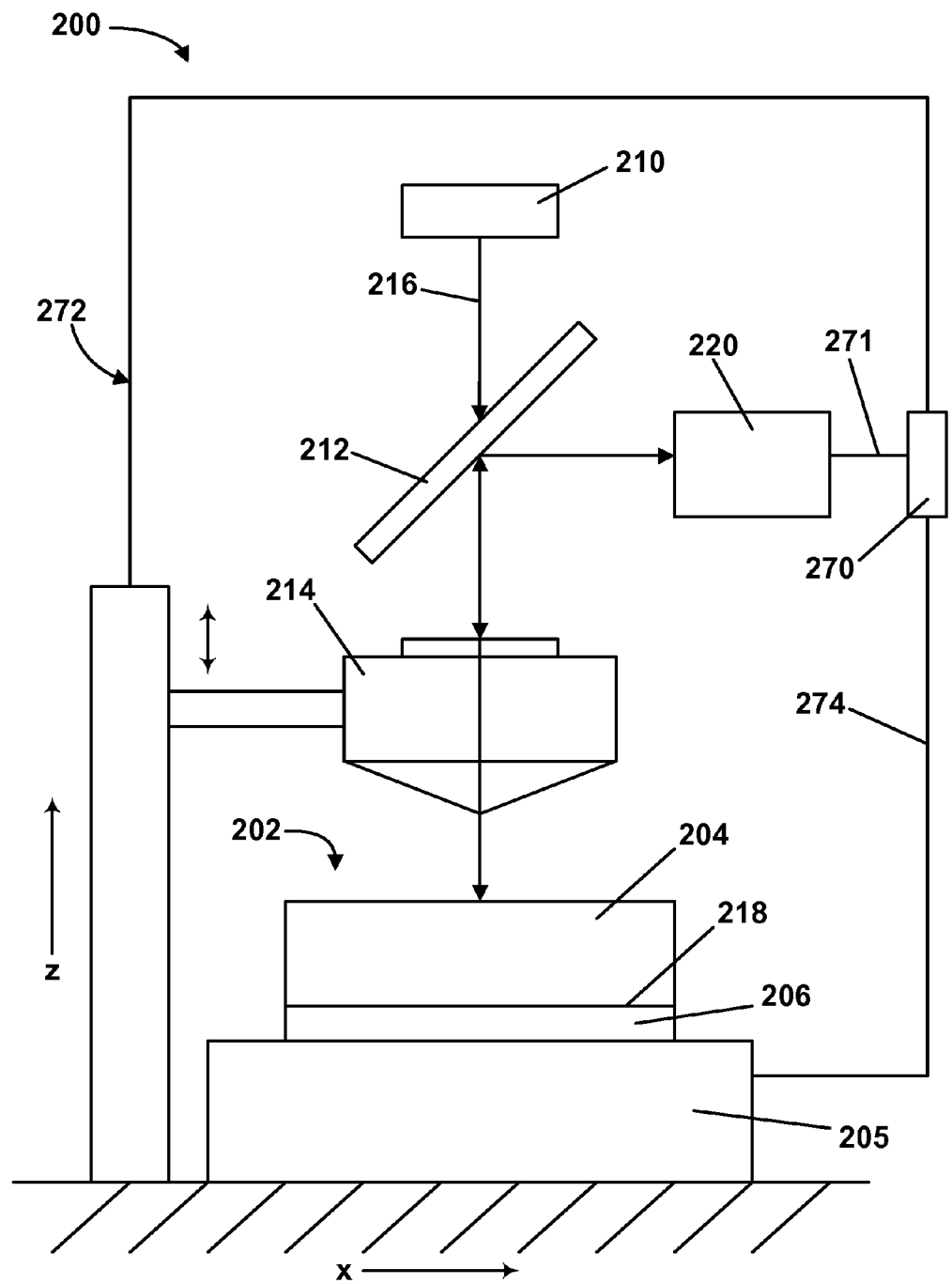
FIG. 7 is a block diagram illustrating exemplary logic useful to control the apparatus of FIG. 6.

Referring to FIG. 7, an apparatus 200 is shown that may be used to cure a region 202 of a layer 204 including a multiphoton curable photoreactive material. The layer 204 is applied to a substrate 206, and the substrate 206 rests on an adjustable platform or stage 205. The height of the stage 205 along the z direction, as well as the tilt above or below the x-y plane of the layer 204, is adjustable manually or by a digital computer 270 via a control line 274. A light beam 216, which includes both the interrogation light and the curing light, is emitted from a source 210 and initially traverses a first optical system including a beamsplitter 212 and a focusing positive lens 214. The height of the focusing positive lens 214 along the z direction is also adjustable manually or by the digital computer 270 via a control line 272. After leaving the positive lens 214 the light beam 216 enters the layer 204, optionally cures or initiates cure of the multiphoton curable photoreactive material in the region 202 of the layer 204, and a portion thereof is reflected off the substrate 206 at an interface 218. The light beam 216 then enters a second optical system including the positive lens 214 and a chromatic confocal sensor 220.

Figure 8:
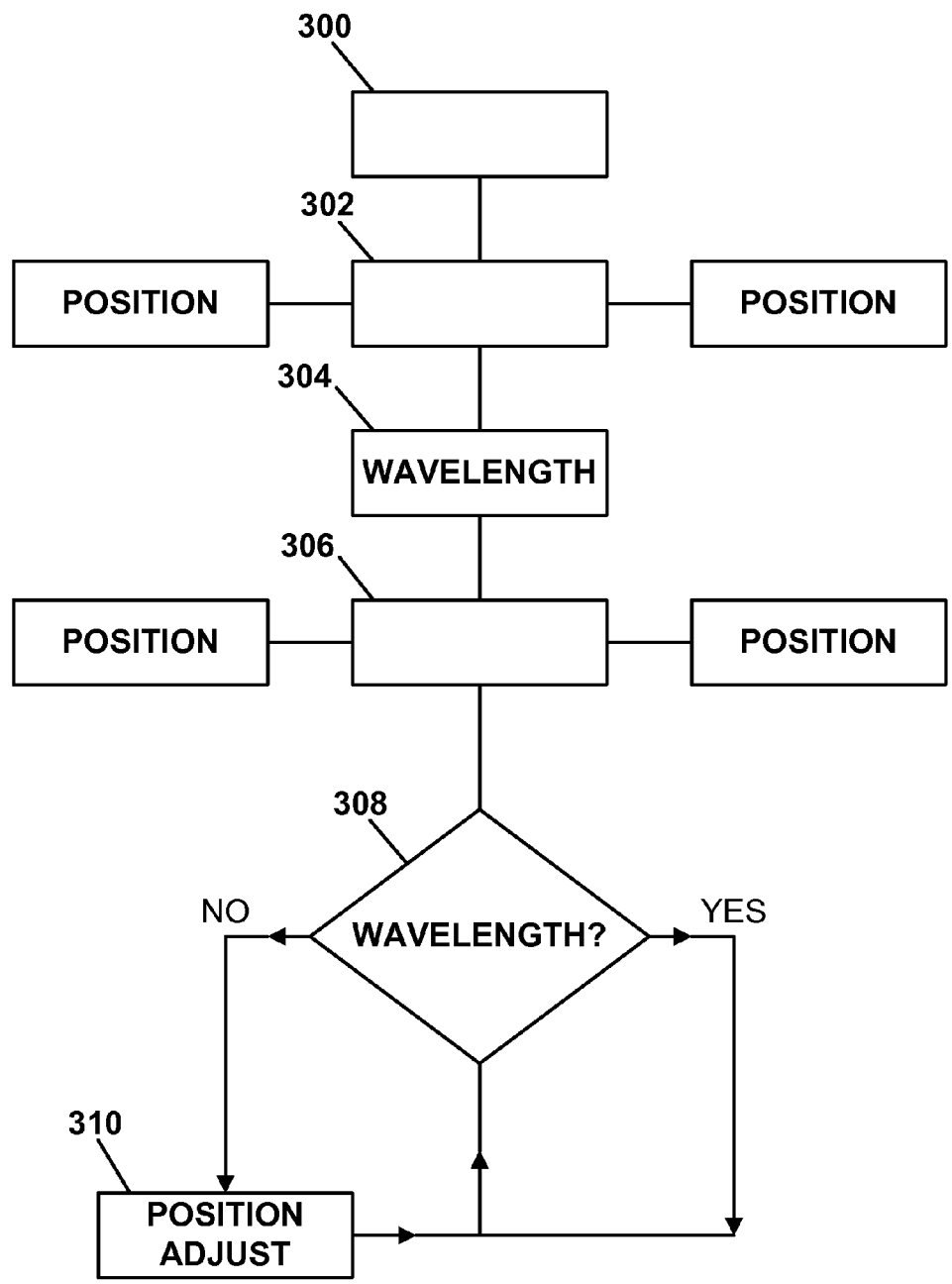
FIG. 8 is a flow chart showing steps for adjusting position.

The output of the chromatic confocal sensor 220 is then provided to the digital computer 270 along a line 271. Referring also to FIG. 8, after initializing at step 300, the computer 270 receives at step 302 position data from the positive lens 214 and the adjustable stage 205, as well as data comprising a location signal including a wavelength of light from the chromatic confocal sensor 220. In step 304, the computer 270 correlates the signal from the chromatic confocal sensor 220 with the height of the positive lens 214 along the z direction with respect to the interface 218, as well as with the tilt of the stage 205. In step 306, position data and detector data are input to the computer 270, and in step 308 the computer evaluates the detector data to determine whether the wavelength detected by the chromatic confocal sensor 220 is the desired wavelength. If yes, the position of the positive lens 214 along the z direction is unchanged. If no, in step 310 the computer adjusts the height of the positive lens 214 along the z axis until the wavelength detected by the chromatic confocal sensor 220 is the desired wavelength.

Using this continuous feed back system, the above described method and apparatus can be used to accurately find the interface 218 in a number of ways. For example, in a static method, the detector 220 is used as an optical probe to sample the layer 204/substrate 206 interface at several different spots, typically at least three spots, on the surface of the substrate 206. If the position of the focus plane of the desired wavelength of light along the z axis with respect to the location of the interface 218 is not within about ±0.5 μm for all sampled location on the substrate 206, the computer 270 performs the necessary calculations to adjust either the positive lens 214 and/or the stage 205. Once the substrate 206 is sufficiently level to the plane of motion along the x axis underneath the positive lens 214, the region 202 of the layer 204 can be cured using the light beam 216. This method can only be used on substrates that are sufficiently flat since only the tilt of the substrate with respect to the x-y plane can be corrected.

In one embodiment, for example, a dynamic method may also be used to provide continuous feedback on the location of the interface 218 as the positive lens 214 moves and the multiphoton curable photoreactive material in the layer 204 is cured to form an object. For example, the location of interface 218 between layer 204 and substrate 206 may be determined intermittently as the layer is at least partially cured. This method can correct for any unflatness in the surface of the substrate 206 since the position of the positive lens 214 with respect to interface 218 along the z axis is nearly continuously corrected as curing proceeds from a first region of the layer 204 to a second region and so on. This continuous dynamic feedback also makes it possible to build structures on top of nominally non-flat surfaces such as spheres and aspheres.

Exemplary multiphoton curable photoreactive compositions useful in the processes described herein are discussed in detail in the copending application with 60/747,609, entitled, "Process for Making Light Guides with Extraction Structures and Light Guides Produces Thereby," and the copending application with 60/979,229, entitled, "Highly Functional Multiphoton Curable Reactive Species," both of which are incorporated herein by reference in their entirety.

The multiphoton curable photoreactive composition in the applied layer includes at least one reactive species that is capable of undergoing an acid or radical initiated chemical reaction, as well as a multiphoton initiator system. Imagewise exposure of the layer with light of an appropriate wavelength and sufficient intensity causes two-photon absorption in the multiphoton initiator system, which induces in the reactive species an acid or radical initiated chemical reaction in a region of the layer that is exposed to the light. This chemical reaction causes a detectable change in the chemical or physical properties in the region of the layer that is exposed to the light. Examples of detectable changes include, for example, crosslinking, polymerization or a change in solubility characteristics in the exposed region. The occurrence of any of these detectable changes is referred to herein as curing, and the curing continues until a cured object is formed. The curing step may take place in any area within the layer including the multiphoton photoreactive composition, including adjacent the interface with the substrate on which the layer is applied. Following the curing step, the layer may optionally be developed by removing a non-cured portion of the layer to obtain the cured object, or by removing the cured object itself from the layer.

While various embodiments relating to multiphoton curable reactive compositions have been described, it will be understood that the chromatic confocal sensor described in this disclosure may be used in any process that requires knowledge of the location of an interface between two materials, or a surface of a material, with respect to an optical system. Other examples of suitable systems include multiphoton reduction of metal ions out of solution and the like.

Various embodiments of the invention have been described. These and other embodiments are within the scope of the following claims.

The invention claimed is:

1. A system comprising:
    a substrate having thereon a multiphoton curable photoreactive composition;
    a light source that emits a light beam comprising a plurality of wavelengths onto at least one region of the composition on the substrate; and
    a detector that detects a portion of light reflected from the composition to obtain a location signal with respect to the substrate, wherein the location signal is based on at least a wavelength of the reflected light.

2. The system of claim 1, wherein the location signal further comprises an intensity of the light reflected off the substrate.

3. The system of claim 1, wherein the location signal further comprises a size of the light reflected off the substrate.

4. The system of claim 1, wherein the detector comprises a camera.

5. The system of claim 1, wherein the detector comprises a spectrometer.

6. The system of claim 1, wherein the substrate is on a moveable stage.

7. The system of claim 1, wherein the light source is moveable.

8. The system of claim 1, wherein the light beam at least partially cures a region of the multiphoton curable photoreactive composition.

9. The system of claim 1, further comprising a second light beam emitted from a second light source, wherein the second light beam at least partially cures a region of the multiphoton curable photoreactive composition.

10. The system of claim 1, further comprising a fiber optic cable which directs the reflected light to the detector.

11. The system of claim 1, further comprising at least two fiber optic cables which may direct the reflected light to the detector, wherein at least one of the fiber optic cables comprises a diameter different than the diameter of at least one other of the fiber optic cables.

12. The system of claim 1, wherein the light source comprises an ultrafast laser.

13. A method comprising:
    providing a substrate having thereon a multiphoton curable photoreactive composition;
    applying at least one light beam comprising a plurality of wavelengths to at least one region of the material, wherein at least one of the wavelengths comprises a sufficient intensity to at least partially cure the multiphoton curable photoreactive composition by multiphoton absorption; and processing a portion of the light reflected off the material to obtain a location signal with respect to the substrate, wherein the location signal comprises the wavelength of the reflected light.

14. The method of claim 13, wherein the at least one light beam comprises a first light beam and a second light beam.

15. The method of claim 14, wherein the first light beam comprises the at least one of the wavelengths which comprises a sufficient intensity to at least partially cure the multiphoton curable photoreactive composition, and the second light beam comprises the portion of the light beam reflected off the material to obtain a location signal with respect to the material.

16. The method of claim 14, where the first light beam at least partially cures a region of the multiphoton curable photoreactive composition before, after, or at the same time as the processing step to form a cured object.

17. The method of claim 13, wherein a single light beam comprises the at least one of the wavelengths which comprises a sufficient intensity to at least partially cure the multiphoton curable photoreactive composition and the portion of the light beam reflected off the material to obtain a location signal with respect to the material.

18. The method of claim 13, wherein the location signal further comprises an intensity of the light reflected off of the substrate.

19. The method of claim 13, wherein the location signal further comprises a shape of the light reflected off of the substrate.

20. The method of claim 13, wherein the location signal is obtained from an optical apparatus comprising a fiber optic cable.

21. The method of claim 13, wherein the optical apparatus further comprises at least two fiber optic cables and at least two detectors, wherein each fiber optic cable directs light to a respective one of the at least two detectors.

22. The method of claim 13, wherein the step of applying at least one light beam comprises introducing chromatic aberration into the at least one light beam.

23. The method of claim 13, further comprising removing from the substrate at least a portion of an uncured material.

24. The method of claim 13, further comprising adjusting a relative location of the substrate and the at least one light beam in response to the location signal.

25. A system, comprising:
a multiphoton curable photoreactive composition;
a light source emitting a light beam comprising a plurality of wavelengths incident onto at least a region of the composition, at least a portion of the light beam being reflected by the composition; and
a detector detecting the reflected beam and generating a position signal based on a wavelength of the reflected beam.

* * * * *

UNITED STATES PATENT AND TRADEMARK OFFICE
CERTIFICATE OF CORRECTION

PATENT NO. : 8,451,457 B2
APPLICATION NO. : 12/681926
DATED : May 28, 2013
INVENTOR(S) : Brian J Gates Page 1 of 1

It is certified that error appears in the above-identified patent and that said Letters Patent is hereby corrected as shown below:

Title Page

Column 1, Item (73)
(Assignee), Line 1,
Delete "3m" and insert -- 3M --, therefor.

Column 2, Item (74)
(Attorney, Agent or Firm), Line 1,
Delete "Kristopher" and insert -- Kristofor --, therefor.

Signed and Sealed this
Fifteenth Day of October, 2013

Teresa Stanek Rea
*Deputy Director of the United States Patent and Trademark Office*